United States Patent [19]

Highberger

[11] 4,131,295
[45] Dec. 26, 1978

[54] QUICK CONNECT HITCH ASSEMBLY

[76] Inventor: Clarence Highberger, Highway 59 North, Garnett, Kans. 66032

[21] Appl. No.: 834,340

[22] Filed: Sep. 19, 1977

[51] Int. Cl.² .................................................. B60D 7/00
[52] U.S. Cl. ..................................... 280/475; 280/477
[58] Field of Search ................... 280/475, 477, 478 R, 280/478 A, 478 B, 489, 507

[56] References Cited

U.S. PATENT DOCUMENTS

| | | | |
|---|---|---|---|
| 1,384,944 | 7/1921 | Flood | 280/477 |
| 2,420,725 | 5/1947 | Riggins | 270/477 |
| 2,671,673 | 3/1954 | Benson | 280/477 |
| 2,844,390 | 7/1958 | Smith | 280/477 |
| 3,161,422 | 12/1964 | Wade | 280/477 |
| 3,223,435 | 12/1965 | Yarbrough | 280/489 |
| 3,891,237 | 6/1975 | Allen | 280/478 R |
| 3,926,456 | 12/1975 | Lundebrek | 280/507 |

*Primary Examiner*—Joseph F. Peters, Jr.
*Assistant Examiner*—R. Schrecengost
*Attorney, Agent, or Firm*—Lowe, Kokjer, Kircher, Wharton & Bowman

[57] ABSTRACT

A hitch bar pivotally attached to a clevis connection of a towed vehicle mates with a hollow hitch body resiliently mounted to a towing vehicle. The hitch bar has a pivotal support leg which maintains it at the proper elevation and which is automatically pivoted to a raised storage position when the hitch components are coupled together. As the hitch body receives the bar during the coupling process, a spring loaded latch block enters a notch in the bar to secure the hitch components together. The latch is maintained in the hitching position by a rigid locking pin.

8 Claims, 5 Drawing Figures

U.S. Patent     Dec. 26, 1978     4,131,295
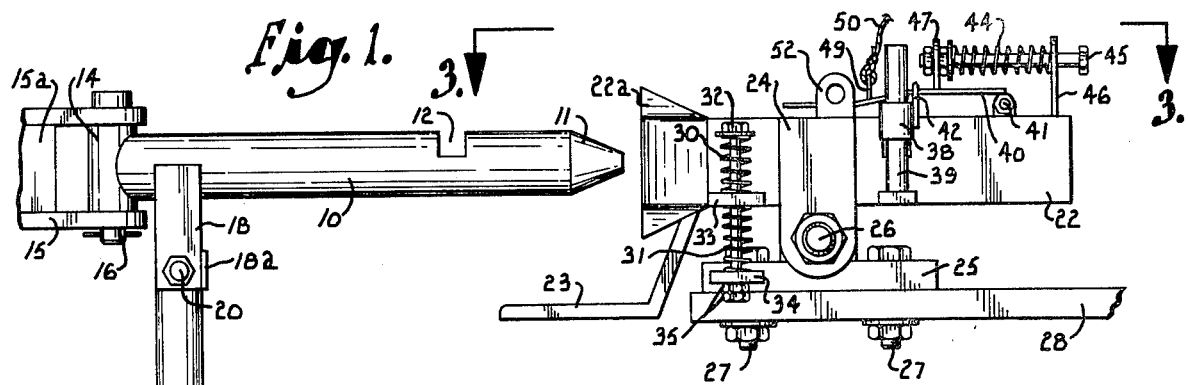
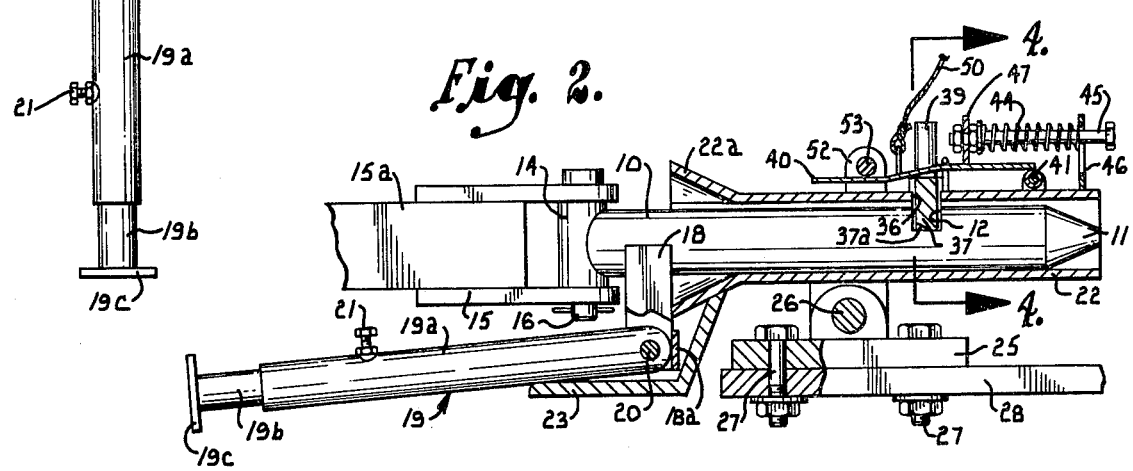
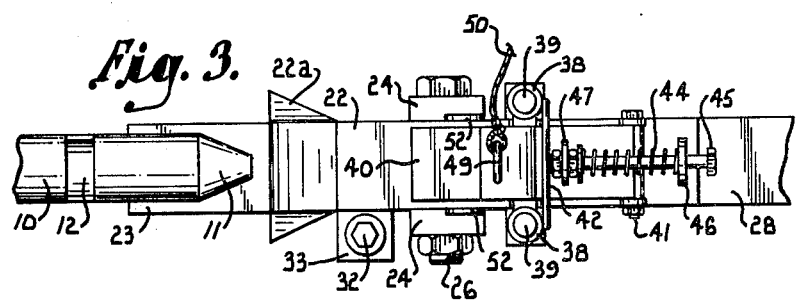
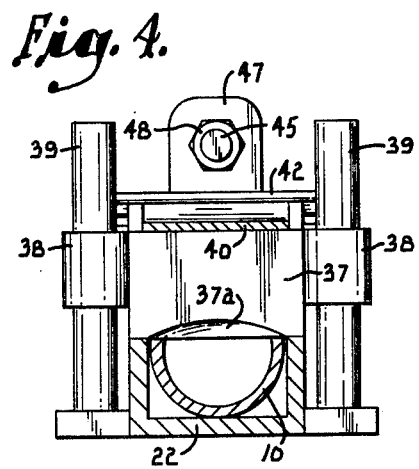
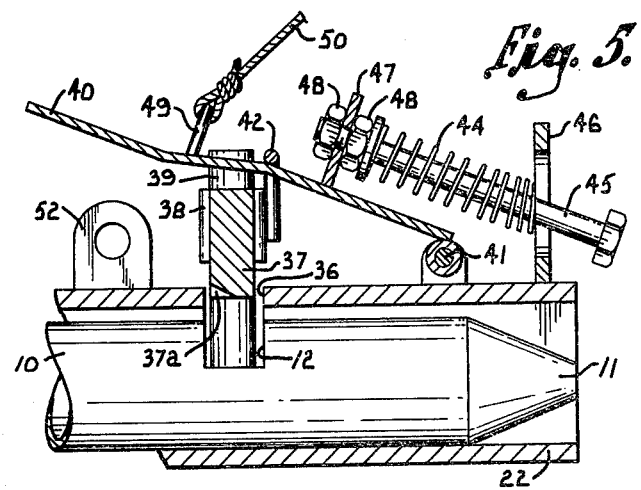

QUICK CONNECT HITCH ASSEMBLY

BACKGROUND AND SUMMARY OF THE INVENTION

This invention relates generally to the hitching of vehicles and deals more particularly with a quick connect hitch device which couples vehicles together in an improved manner.

Various types of hitch devices have been proposed for automatically coupling towing vehicles to towed vehicles. In addition to traditional uses such as hitching wagons to tractors, quick connect hitches have been increasingly used to couple trailers and the like to automobiles, "pickup" type trucks and other vehicles. However, despite their widespread use, existing quick connect hitch devices have not been entirely satisfactory in all respects.

Typically, such hitches employ a spring loaded hitch pin which is normally held by a latch with the spring under compression. As the hitch components are coupled, the latch is disengaged to release the pin which then moves under the influence of the spring to the hitching position. Since the spring is held in a tightly compressed condition most of the time, it tends to wear out rather quickly. Additionally, it is common for more than one spring to be required in the hitches that have been proposed, thereby further compounding the difficulties. Uncoupling of the vehicle involves not only releasing the hitch pin but also maneuvering the latch to its latching position. Consequently, either a series of manual steps must be performed, or a complicated mechanical linkage must be provided to effect movement of the various components to their release positions. The overall complexity and expense of existing hitch assemblies has further detracted from their acceptance, as has the inaccessibility of the parts for inspection and repair.

Problems have also been encountered in achieving proper alignment of the hitch components during the coupling process. Although it has been proposed to provide a support leg on one hitch component, as in the Smith patent 2,844,390, such proposals have not achieved entirely satisfactory results. Existing hitches have also lacked a positive means for rigidly locking the components together, and, as a result, inadvertent disconnection can occur at inopportune times.

Ordinarily, existing hitches are capable of pivoting about the pin which connects the hitch components together. The excessive forces that are thus applied to the hitch pin can break it and can also cause undue wear on the associated components. Further, the hitch components in existing devices are rigidly connected to the vehicles and are thus unable to effectively accommodate irregularities in the terrain.

It is an important object of the present invention to provide an improved quick connect hitch assembly that may be employed to connect a wide variety of vehicles. In this regard, one hitch component may be easily attached to virtually any type of towed vehicle having a clevis hitch, while the other hitch component may be mounted either to a draw bar or rear bumper of the towing vehicle.

Another object of the invention is to provide an automatic hitch assembly which is adapted to quickly and easily couple and uncouple vehicles. It is significant in this respect that release of the hitch is accomplished simply by pulling a rope rather than by means of a complex linkage as is prevalent in the prior art.

Still another object of the invention is to provide an automatic hitch assembly of the character described which requires only a single spring to effect hitching. In addition, since the spring is not compressed excessively, its useful life is increased substantially.

A further object of the invention is to provide, in a hitch assembly of the character described, a support leg for maintaining one hitch component at the desired elevation, along with means for automatically moving the support leg to a horizontal storage position when the hitch components are coupled.

An additional object of the invention is to provide a hitch assembly of the character described which includes a locking pin for positively locking the components in the hitched position.

Yet another object of the invention is to provide, in a hitch assembly of the character described, a resilient mounting arrangement for one hitch component which readily accommodates irregular and uneven terrain.

A still further object of the invention is to provide a hitch assembly of the character described wherein the existing clevis connection of the towed vehicle is used as the pivot point between the vehicles. The forces are thus centered on the sturdy clevis structure, and the hitch components need not be constructed to withstand excessive forces.

An additional object of the invention is to provide, in a hitch assembly of the character described, a unique latch arrangement which firmly couples the hitch components together and which is accurately guided between the hitching position and the release position.

Still another object of the invention is to provide a hitch assembly of the character described which is constructed simply, ecomonically, and ruggedly, and in which the parts are readily accessible for inspection and maintenance.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views:

FIG. 1 is a side elevational view of a hitch assembly constructed according to a preferred embodiment of the present invention, with the hitch components separated from one another in position to be coupled;

FIG. 2 is an elevational view similar to FIG. 1, but showing hitch components coupled together and with portions in cross section for purposes of illustration;

FIG. 3 is a fragmentary top plan view taken generally along line 3—3 of FIG. 1 in the direction of the arrows;

FIG. 4 is a fragmentary sectional view on an enlarged scale taken generally along 4—4 of FIG. 2 in the direction of the arrows; and FIG. 5 is a fragmentary sectional view on an enlarged scale similar to FIG. 2 but showing the latch in its release position.

Referring now to the drawing in greater detail, reference numeral 10 generally designates a hollow tubular bar which forms one component of the hitch assembly. For increased strength, bar 10 may instead be a solid member. The bar 10 tapers substantially to a point 11 at its free end and is provided with a generally rectangular notch 12 in its upper surface at a location spaced somewhat from the point 11. The end of bar 10 opposite point 11 is provided with a vertical sleeve 14 which may be received within a conventional clevis connection 15 of the type carried on the tongue 15a of a trailer, wagon, or other vehicle which is to be towed. A standard hitch pin 16 may be employed to connect sleeve 14 within clevis 15, allowing bar 10 to pivot about the vertical axis of the hitch pin.

A pair of spaced apart bracket plates 18 project downwardly from bar 10 at a location near the sleeve 14. The upper end of a support leg 19 is pivotally connected at 20 between the bracket plates 18. The support leg 19 includes an upper tubular portion 19a which telescopically receives a post 19b having a flat base plate 19c on its lower end. A set screw 21 is threaded through tube 19a and may be tightened against post 19b to fix the length of the leg. A rigid bar 18a extends between plates 18 and serves to engage leg 19 in order to limit the extent to which the leg may be pivoted in a counterclockwise direction as viewed in FIG. 1. Leg 19 is able to pivot about coupling 20 between the upright support position shown in FIG. 1, wherein plate 19c rests on the ground to maintain bar 10 at the desired elevation, and the substantially horizontal storage position shown in FIG. 2. The telescopic fit of post 19b in tube 19a, together with set screw 21, permits adjustment of the effective length of leg 19 so that the elevation of bar 10 may be varied as desired.

Reference numeral 22 designates a hollow metal hitch body 22 which is large enough to closely receive the hitch bar 10. Body 22 is a rectangular, box like structure open at one end and having a flared mouth 22a at the open end to facilitate the entry of bar 10 into the body. Extending downwardly and then outwardly from the underside of body 22 near the mouth 22a is a bent plate 23 which serves to hold leg 19 in the storage position (FIG. 2). The outer edge of plate 23 is located well beyond and below the open end of body 22.

The central portion of body 22 has a pair of spaced apart bracket plates 24 which are pivotally coupled at their lower ends to a thickened portion of a flat mounting plate 25. A horizontal pivot pin 26 serves to pivotally connect the bracket plates with the mounting plate. Plate 25 is in turn bolted flatly at 27 to the top side of a draw bar 28 such as that of a tractor (not shown). It is pointed out that plate 25 may alternatively be mounted to the underside of the rear bumper or to the frame of the towing vehicle.

A pair of compression springs 30 and 31 resiliently urge body 22 toward the stable horizontal position shown in FIG. 1. The springs are fit around an elongate vertical bolt 32 which extends through a lug 33 formed on body 22 and also through another lug 34 projecting sidewardly from mounting plate 25. A pair of nuts 35 are threaded onto the lower end of bolt 32 and against the underside of lug 34. Spring 30 is retained between the screw head and lug 33 to resiliently bias body 22 about pin 26 in a counterclockwise direction (FIG. 1), while spring 31 acts between lugs 33 and 34 to urge the body in a clockwise direction. The springs are of equal force so that ordinarily their effect is cancelled and hitch body 22 is maintained in a horizontal position. Nuts 35 may be tightened or loosened in order to adjust the biasing forces provided by springs 30 and 31.

Approximately midway along its length, the upper wall of body 22 is provided with a slot 36 which receives a rectangular latch block 37. The block 37 is received closely in slot 36 and is able to move upwardly and downwardly therein in linear fashion. Block 37 is sized to fit rather closely in notch 12. As best shown in FIGS. 4 and 5, the lower front corner of block 37 is formed in a manner to present a curved, concave surface 37a.

The opposite sides of block 37 are rigidly connected with small vertical sleeves 38 which fit slidably over respective guide posts 39 mounted to and projecting upwardly from the opposite sides of body 22. The rather close fit of sleeves 38 on posts 39 restricts block 37 to vertical movement and maintains the latch block in alignment with slot 36.

Movement of block 37 between the hitching position (FIG. 2) and the release position (FIG. 5) is effected by a pivotal plate 40 which functions essentially as a lever. One end of plate 40 is connected to the upper surface of body 22 by a hinge having a horizontal hinge pin 41 about which the plate may pivot. The central portion of plate 40 is received rather closely between the upper surface of block 37 and a rigid wire 42 which is welded to extend between sleeves 38 at a location spaced slightly above the block.

Latch 37 is continuously urged toward the FIG. 2 hitching position by a compression spring 44 which is fit around a bolt 45. The bolt 45 extends through a vertical slot formed in a lug 46 projecting from the upper surface of body 22. The threaded end of bolt 45 extends through a small lug 47 mounted on plate 40, with nuts 48 being threaded onto the bolt to secure it to lug 47. Spring 44 acts between lugs 46 and 47 and thus urges plate 40 in a counterclockwise direction as viewed in FIGS. 2 and 5. Nuts 48 may be adjusted to adjust the spring force. Plate 40 has an eye 49 to which a rope 50 may be tied.

As an alternative to spring 44, coil springs (not shown) may be fitted around posts 39 above the sleeves 38 and retained on the posts by nuts, collars, or another type of retaining device. This alternative arrangement simplifies the construction of the device somewhat and eliminates certain of the components.

A pair of lugs 52 are welded to the tops of the opposite brackets 24 in upward projection therefrom. A locking pin 53 (FIG. 2) which may be in the form of a nut and bolt assembly is able to be fit through openings formed in lugs 52, with the pin 53 lying immediately above the upper surface of plate 40. This positively locks plate 40 against the upper surface of body 22 to preclude movement of block 37 from the hitching position.

As previously indicated, body 22 is mounted on the towing vehicle and bar 10 is connected with the vehicle that is to be towed. With leg 19 in the upright support position and adjusted to the appropriate length, bar 10 is maintained at the proper elevation to enter body 22.

As the towing vehicle is backed such that bar 10 is received in body 22, the tapered point 11 of the bar contacts the curved concave surface 37a of the latch block 37. The resultant camming action raises block 37 sufficiently to enable bar 10 to fully enter the body 22. When this occurs and notch 12 has reached a position to register with the block, the force of spring 44 automatically lowers the latch block into the notch. The cooperation between block 37 and notch 12 firmly couples the vehicles together and precludes relative movement in any direction between the bar and hitch body due to the rectangular shapes of the block and notch. The rigid locking pin 53 may then be inserted through lugs 52 and secured in place to lock the latch 37 within notch 12.

As the hitching process occurs, the outer edge of plate 23 contacts leg 19 at a location below the pivot coupling 20. Consequently, leg 19 is automatically raised by plate 23 to the storage position and is held therein while the hitch components remain coupled. Uncoupling results in the weight of leg 19 automatically lowering it to the support position of FIG. 1. It is noted that plate 23 is able to maintain leg 19 in a nearly horizontal storage position (FIG. 2) so that it is well above the ground.

When irregular terrain is encountered, the entire hitch assembly is able to pivot about the horizontal axis of pivot coupling 26, with springs 30 and 31 acting to return the hitch to the stable position. In addition, the towed vehicle is able to turn about the vertical axis provided by the sturdy hitch pin 16. As a result, the forces are applied mainly to pins 16 and 26 so that excessive wear on the other parts of the hitch assembly is avoided.

When the vehicles are to be uncoupled, locking pin 53 is removed and plate 40 is pulled upwardly to the release position by rope 50. This causes plate 40 to pull upwardly on wire 42, thereby raising block 37 out of notch 12 to the FIG. 5 release position. After the hitch components have been separated, rope 50 is released and the force of spring 44 returns block 37 to its lower or latching position. Separation of the hitch components also results in the automatic return of leg 19 to the upright support position wherein bar 10 is maintained at the proper elevation to again be hitched to body 22.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. A hitch assembly for coupling first and second vehicles for towing, said hitch assembly comprising:
   a bar member adapted to be mounted on the first vehicle in substantially horizontal extension therefrom, said bar member having a notch defined therein;
   a body member adapted to be mounted on the second vehicle, said body member having a substantially hollow interior and an open end for receiving said bar member;
   at least one substantially straight guide post on said body member;
   a sleeve received on said guide post for sliding movement axially thereon;
   a latch element carried on said sleeve for movement therewith between a hitching position projecting into the interior of said body member at a location to register with said notch in a manner to retain said bar member hitched to said body member within the latter, and a release position displaced from said notch; and
   resilient means for biasing said latch element to the hitching position,
   said bar member having a free end portion formed to engage a cooperating surface of said latch element in camming fashion to automatically displace the latter from its hitching position as the bar member is entering said body member, with said resilient means effecting automatic movement of said latch element to the hitching position in registration with said notch when the bar member reaches a fully inserted position within the body member.

2. A hitch assembly as set forth in claim 1, including means for rigidly locking said latch element in its hitching position.

3. A hitch assembly as set forth in claim 1, including a tapered end on the free end portion of said bar member and a curved surface on said latch element providing said cooperating surface thereof.

4. A hitch assembly as set forth in claim 1, including a lever pivotally coupled with said body member and operable to effect linear movement of said sleeve to move said latch element between the hitching and release positions in response to pivotal movement of said lever, said resilient means acting on said lever to urge same in a pivotal direction to bias said latch element to the hitching position.

5. A hitch assembly as set forth in claim 1, including:
   a mounting plate for said body member adapted to be mounted to the second vehicle;
   means connecting said body member with said mounting plate for pivotal movement about a generally horizontal axis; and
   means resiliently urging said body member toward a preselected position about said axis.

6. A hitch assembly as set forth in claim 4, including:
   a rigid locking element; and
   means for securing said locking element against said lever to prevent movement of said latch element away from the hitching position.

7. A hitch assembly for coupling first and second vehicles for towing, said hitch assembly comprising:
   a bar member adapted to be mounted on the first vehicle in substantially horizontal extension therefrom, said bar member having a notch defined therein;
   a body member adapted to be mounted on the second vehicle, said body member having a substantially hollow interior and an open end for receiving said bar member and presenting an opening;
   a latch element mounted on said body member for linear movement in said opening between a hitching position projecting through said opening into the interior of said body member at a location to register with said notch in a manner to retain said bar member hitched to said body member within the latter, and a release position displaced from said notch; and resilient means for biasing said latch element to the hitching position,
   said bar member having a free end portion formed to engage a cooperating surface of said latch element in camming fashion to automatically displace the latter from its hitching position as the bar member is entering said body member, with said resilient means effecting automatic movement of said latch element to the hitching position in registration with said notch when the bar member reaches a fully inserted position within the body member, a lever pivotally coupled with said body member and operable to effect linear movement of said latch element between the hitching and release positions in response to pivotal movement of said lever, said resilient means acting on said lever to urge same in a pivotal direction to bias said latch element to the hitching position.

8. A hitch assembly as set forth in claim 7, including:
a rigid locking element; and
means for securing said locking element against said lever to prevent movement of said latch element away from the hitching position.

* * * * *